United States Patent
Gupta et al.

(10) Patent No.: US 9,663,707 B2
(45) Date of Patent: May 30, 2017

(54) STIMULATION METHOD USING BIODEGRADABLE ZIRCONIUM CROSSLINKER

(71) Applicant: Baker Hughes Incorporated, Houston, TX (US)

(72) Inventors: D. V. Satyanarayana Gupta, The Woodlands, TX (US); Paul S. Carman, Spring, TX (US); Minh Vo, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 273 days.

(21) Appl. No.: 14/061,485

(22) Filed: Oct. 23, 2013

(65) Prior Publication Data

US 2015/0107844 A1   Apr. 23, 2015

(51) Int. Cl.
| | |
|---|---|
| C09K 8/68 | (2006.01) |
| E21B 43/26 | (2006.01) |
| E21B 43/25 | (2006.01) |
| C09K 8/88 | (2006.01) |
| C09K 8/035 | (2006.01) |
| C09K 8/72 | (2006.01) |

(52) U.S. Cl.
CPC .............. *C09K 8/685* (2013.01); *C09K 8/035* (2013.01); *C09K 8/725* (2013.01); *C09K 8/887* (2013.01); *E21B 43/255* (2013.01); *E21B 43/26* (2013.01)

(58) Field of Classification Search
CPC ........ E21B 43/26; E21B 43/255; C09K 8/685
See application file for complete search history.

(56) References Cited

U.S. PATENT DOCUMENTS

| | | | | |
|---|---|---|---|---|
| 4,477,360 | A * | 10/1984 | Almond | C09K 8/685 |
| | | | | 166/308.5 |
| 4,480,696 | A * | 11/1984 | Almond | C09K 8/703 |
| | | | | 166/308.6 |
| 4,534,870 | A | 8/1985 | Williams | |

(Continued)

FOREIGN PATENT DOCUMENTS

| | | | | |
|---|---|---|---|---|
| CA | 2583105 A1 * | 3/2007 | | C08L 1/10 |
| EP | 0092756 A2 | 11/1983 | | |

OTHER PUBLICATIONS

J. Deschanvres, J. Vaca, J. Joubert; "Thin Films of Zirconia-Phosphate Glasses Deposited by an Aerosol CVD Process"; Journal De Physique IV; Jan. 1, 1995; pp. 5-1029; vol. 05; XP55151907 DOI: 10.1051/jphyscol:19955121; p. 1030 table.

(Continued)

*Primary Examiner* — Zakiya W Bates
*Assistant Examiner* — Crystal J Miller
(74) *Attorney, Agent, or Firm* — John Wilson Jones; Jones Delflache LLP (57) ABSTRACT

A fracturing fluid containing a hydratable viscosifying polymer and a zirconium acetylacetonate crosslinker provides a green alternative to conventional systems. The zirconium aceylacetonate is dissolved in benzyl alcohol or in a mixture of benzyl alcohol and 2,2-dimethyl-1,3-dioxolan-4(yl)-methanol. The pH of the fracturing fluid may be between from about 3.5 to about 11.5. The fracturing fluid may contain an acidic buffering agent or a basic buffering agent. The fracturing fluid may be pumped into a well in order to initiate or enlarge a fracture within a subterranean formation penetrated by the well.

22 Claims, 4 Drawing Sheets

(56) References Cited

U.S. PATENT DOCUMENTS

| | | | |
|---|---|---|---|
| 5,002,125 A * | 3/1991 | Phillips | E21B 43/26 166/271 |
| 5,305,832 A * | 4/1994 | Gupta | C08L 5/14 166/300 |
| 5,412,022 A * | 5/1995 | Andres | C08K 5/0091 524/476 |
| 6,090,399 A * | 7/2000 | Ghosh | A01N 25/08 424/405 |
| 6,235,914 B1 * | 5/2001 | Steiger | A61K 8/44 252/8.61 |
| 6,461,631 B1 * | 10/2002 | Dunn | A61K 9/0024 424/426 |
| 6,528,080 B2 * | 3/2003 | Dunn | A61K 9/0024 424/426 |
| 6,737,485 B1 | 5/2004 | St. Clair et al. | |
| 6,983,801 B2 | 1/2006 | Dawson et al. | |
| 7,316,275 B2 | 1/2008 | Wang et al. | |
| 7,455,112 B2 * | 11/2008 | Moorehead | C09K 8/74 166/282 |
| 7,718,582 B2 | 5/2010 | Le et al. | |
| 7,754,749 B2 * | 7/2010 | Koradin | C07D 249/08 514/383 |
| 8,022,015 B2 | 9/2011 | Carman et al. | |
| 8,034,750 B2 * | 10/2011 | Thompson | C08B 37/0096 166/280.1 |
| 8,082,994 B2 * | 12/2011 | Nguyen | E21B 43/267 166/276 |
| 8,636,066 B2 | 1/2014 | Gupta et al. | |
| 8,657,003 B2 * | 2/2014 | Welton | C09K 8/032 166/279 |
| 8,967,264 B2 | 3/2015 | Nguyen | |
| 9,057,013 B2 | 6/2015 | Lord et al. | |
| 9,062,238 B2 | 6/2015 | Kesavan et al. | |
| 9,080,094 B2 | 7/2015 | Nguyen et al. | |
| 9,090,814 B2 | 7/2015 | Armstrong et al. | |
| 2002/0090398 A1 * | 7/2002 | Dunn | A61K 9/0024 424/486 |
| 2002/0125012 A1 * | 9/2002 | Dawson | C09K 8/887 166/300 |
| 2005/0016733 A1 * | 1/2005 | Dawson | C09K 8/887 166/308.2 |
| 2008/0078549 A1 * | 4/2008 | Moorehead | C09K 8/74 166/282 |
| 2008/0128131 A1 * | 6/2008 | Nguyen | E21B 43/267 166/280.2 |
| 2008/0200528 A1 * | 8/2008 | Koradin | C07D 249/08 514/383 |
| 2008/0287325 A1 * | 11/2008 | Thompson | C08B 37/0096 507/273 |
| 2009/0149353 A1 | 6/2009 | Dajani et al. | |
| 2009/0149354 A1 | 6/2009 | Dajani et al. | |
| 2011/0308802 A1 * | 12/2011 | Ladva | C09K 8/035 166/305.1 |
| 2012/0138303 A1 * | 6/2012 | Welton | C09K 8/032 166/300 |
| 2012/0220503 A1 * | 8/2012 | Sanchez Reyes | C09K 8/685 507/213 |
| 2012/0285693 A1 * | 11/2012 | Mirakyan | C09K 8/605 166/308.1 |
| 2013/0048282 A1 * | 2/2013 | Adams | E21B 43/267 166/279 |
| 2013/0196885 A1 * | 8/2013 | Pabalan | C09K 8/68 507/246 |
| 2013/0203637 A1 | 8/2013 | Gupta et al. | |
| 2014/0073538 A1 * | 3/2014 | Saini | C09K 8/512 507/215 |
| 2014/0138087 A1 | 5/2014 | Gupta | |
| 2014/0260466 A1 * | 9/2014 | Rehage | C05F 11/00 71/23 |
| 2014/0262283 A1 * | 9/2014 | Savari | E21B 21/003 166/305.1 |
| 2014/0271928 A1 * | 9/2014 | Rehage | A61K 8/97 424/680 |
| 2014/0352969 A1 * | 12/2014 | Chung | C09K 8/12 166/308.3 |
| 2014/0367108 A1 * | 12/2014 | Chung | C09K 8/74 166/307 |
| 2015/0083423 A1 | 3/2015 | Brannon et al. | |
| 2015/0099681 A1 * | 4/2015 | Rehage | C05F 11/00 510/179 |
| 2015/0101818 A1 * | 4/2015 | Gupta | C09K 8/685 166/308.5 |
| 2015/0232610 A1 * | 8/2015 | Leitner | C08L 75/16 524/590 |
| 2015/0252124 A1 * | 9/2015 | Gaefke | C04B 28/02 523/401 |

OTHER PUBLICATIONS

International Search Report, International Application No. PCT/US2014/052922, Aug. 27, 2014.

Mackenzie Company, LLC, "Metal Acetylacetonates", Technical Data, 1 page.

TCI Europe NV, "Safety Data Sheet according to EC Directive 2001/58/EC", Revision 1, Nov. 14, 2006.

* cited by examiner

STIMULATION METHOD USING BIODEGRADABLE ZIRCONIUM CROSSLINKER

FIELD OF THE DISCLOSURE

The disclosure relates to a well treatment fluid containing a hydratable polymer and a biodegradable crosslinker of zirconium acetylacetonate dissolved in benzyl alcohol and to methods of using the same.

BACKGROUND OF THE DISCLOSURE

The success of well treatment operations often depends on optimizing placement of fluids downhole. In the past, much interest has focused on methods for improving downhole placement of well treatment fluids used in acid stimulation and hydraulic fracturing operations. Both of these operations enhance the production of hydrocarbons within the formation.

During acid simulation, such as by matrix acidizing, acid or an acid-forming material is injected into the formation and the acid reacts with minerals in the formation. As a result, near-wellbore permeability is improved by the opening of channels or wormholes within the formation. Early attempts at optimizing the placement of acid downhole focused on injection of a simple acidic solution into the wellbore. However, where the treated formation contained sections with varying permeability, the injected acid typically acidized the zone within the formation which had the highest permeability and the highest degree of water saturation. A permeability contrast between areas of high permeability (treated areas) within the formation and areas of low permeability (untreated areas) resulted.

In order to provide uniform distribution of treatment fluid within a treated zone, chemical diverting fluids have been developed which increase flow resistance within the formation and thus allow for the flow of treatment fluids from the higher permeability and/or water saturated sections of the formation to the lower permeability or oil bearing sections.

In hydraulic fracturing, the stimulation fluid is injected into a wellbore under high pressure. Once the natural reservoir fracture gradient is exceeded, the fracturing fluid initiates a fracture in the formation that generally continues to grow during pumping. The treatment design generally requires the fluid to reach a maximum viscosity as it enters the fracture.

The viscosity of most stimulation fluids is generated using hydratable polymeric viscosifying agents. Crosslinking agents in these fluids increase the viscosity of the fluid and thus improve stimulation of the treated well. When used as a fracturing fluid, the gelled fluid can include a propping agent (i.e., proppant). The proppant remains in the produced fracture to prevent the complete closure of the fracture and to form a conductive channel extending from the wellbore into the formation being treated once the stimulation fluid is recovered.

Conventional crosslinking agents in stimulation fluids contain transition metals such as titanium, zirconium, aluminum, iron and antimony as well as mixtures thereof. Such conventional crosslinking agents include zirconium oxychloride, zirconium acetate, zirconium lactate, zirconium malate, zirconium citrate, titanium lactate, titanium malate, titanium citrate and the like. Other conventional crosslinkers include complexes of transition metal compounds such as zirconium/triethanolamine complexes.

While conventional crosslinking agents enable the requisite viscosity to be attained, they are not particularly environmentally friendly. A need exists for a crosslinking agent that would effectively increase the viscosity of the polymeric viscosifying agent, like a conventional crosslinking agent, but which is environmentally friendly having one or more of the attributes or capabilities described or shown in, or as may be apparent from, the other portions of this patent.

SUMMARY OF THE DISCLOSURE

In an embodiment, a well treatment fluid is disclosed which contains a zirconium acetylacetonate crosslinker dissolved in a solvent of benzyl alcohol as well as a hydratable polymer capable of gelling in the presence of a zirconium acetylacetonate crosslinking agent.

In another embodiment, a well treatment fluid is disclosed which contains a zirconium acetylacetonate crosslinker dissolved in a solvent of benzyl alcohol. The fracturing fluid also contains a hydratable polymer capable of gelling in the presence of a zirconium acetylacetonate crosslinking agent. The pH of the fluid is typically between from about 3.5 to about 11.5.

In another embodiment, a well treatment fluid is disclosed which contains a zirconium acetylacetonate crosslinker dissolved in a solvent of benzyl alcohol. The fluid also contains a hydratable polymer capable of gelling in the presence of a zirconium acetylacetonate crosslinking agent. The fluid further contains an acidic buffering agent such that the pH of the fluid is between from about 4.0 to about 6.5.

In another embodiment, a well treatment fluid is disclosed which contains a zirconium acetylacetonate crosslinker dissolved in a solvent of benzyl alcohol. The fluid also contains a hydratable polymer capable of gelling in the presence of a zirconium acetylacetonate crosslinking agent. The fluid further contains a basic buffering agent such that the pH of the fluid is between from about 8.0 to about 11.0.

In another embodiment, a method of stimulating a subterranean formation penetrated by a wellbore is provided wherein a well treatment fluid is pumped into the wellbore, the well treatment fluid containing a zirconium acetylacetonate crosslinker dissolved in a solvent of benzyl alcohol. The well treatment fluid contains a hydratable polymer capable of gelling in the presence of a zirconium acetylacetonate crosslinking agent.

In another embodiment, a method of fracturing a subterranean formation penetrated by a wellbore is provided wherein a fracturing fluid is pumped into the wellbore at a pressure sufficient to initiate or enlarge a fracture, the fracturing fluid containing a zirconium acetylacetonate crosslinker dissolved in a solvent of benzyl alcohol. The fracturing fluid contains a hydratable polymer capable of gelling in the presence of a zirconium acetylacetonate crosslinking agent.

In another embodiment, a method of fracturing a subterranean formation penetrated by a wellbore is provided wherein a fracturing fluid is pumped into the wellbore, the fracturing fluid containing a zirconium acetylacetonate crosslinker dissolved in a solvent of benzyl alcohol. The fracturing fluid contains a hydratable polymer capable of gelling in the presence of a zirconium acetylacetonate crosslinking agent. The pH of the fracturing fluid is typically between from about 3.5 to about 11.5.

In another embodiment, a method of fracturing a subterranean formation penetrated by a wellbore is provided wherein a fracturing fluid is pumped into the wellbore, the fracturing fluid containing a zirconium acetylacetonate crosslinker dissolved in a solvent of benzyl alcohol. The fracturing fluid contains a hydratable polymer capable of gelling in the presence of a zirconium acetylacetonate crosslinking agent. In addition, the fracturing fluid further contains an acidic buffering agent such that the pH of the fracturing fluid is between from about 4.0 to about 6.5.

In another embodiment, a method of fracturing a subterranean formation penetrated by a wellbore is provided wherein a fracturing fluid is pumped into the wellbore, the fracturing fluid containing a zirconium acetylacetonate crosslinker dissolved in a solvent of benzyl alcohol. The fracturing fluid contains a hydratable polymer capable of gelling in the presence of a zirconium acetylacetonate crosslinking agent. In addition, the fracturing fluid further contains a basic buffering agent such that the pH of the fracturing fluid is between from about 8.0 to about 11.0.

In another embodiment, a method of stimulating a subterranean formation penetrated by wellbore is disclosed wherein a fluid containing zirconium acetylacetonate dissolved in a mixture of benzyl alcohol is pumped into the wellbore. The fracturing fluid further contains a hydratable polymer capable of gelling in the presence of a zirconium acetylacetonate crosslinking agent. The presence of the zirconium acetylacetonate in the fluid delays crosslinking of the hydratable polymer until temperature within the well is at least 100° F.

In another embodiment, a method of stimulating a subterranean formation penetrated by wellbore is disclosed wherein a fluid containing zirconium acetylacetonate dissolved in a mixture of benzyl alcohol is pumped into the wellbore. The fracturing fluid further contains a hydratable polymer capable of gelling in the presence of a zirconium acetylacetonate crosslinking agent. In addition, the fracturing fluid further contains an acidic buffering agent such that the pH of the fracturing fluid is between from about 4.0 to about 6.5. The presence of the zirconium acetylacetonate in the fluid delays crosslinking of the hydratable polymer until temperature within the well is at least 100° F.

In another embodiment, a method of fracturing a subterranean formation penetrated by wellbore is disclosed wherein a fluid containing zirconium acetylacetonate dissolved in a mixture of benzyl alcohol is pumped into the wellbore. The fracturing fluid further contains a hydratable polymer capable of gelling in the presence of a zirconium acetylacetonate crosslinking agent. In addition, the fracturing fluid further contains a basic buffering agent such that the pH of the fracturing fluid is between from about 8.0 to about 11.0. The presence of the zirconium acetylacetonate in the fluid delays crosslinking of the hydratable polymer until temperature within the well is at least 100° F.

In another embodiment, a method of stimulating a subterranean formation penetrated by a well with a well treatment fluid is disclosed, wherein well treatment fluid contains a zirconium acetylacetonate crosslinker dissolved in a solvent of benzyl alcohol. The fluid contains a hydratable polymer capable of gelling in the presence of a zirconium acetylacetonate crosslinking agent. The pH of the fluid is between from about 3.0 to about 6.5. After pumping a first stage of the well treatment fluid into a well penetrating the subterranean formation, subsequent stages of the well treatment fluid are then pumped. The flow of the fluid in the subsequent stages is diverted from a high permeability or damaged portion of the formation to a low permeability or undamaged portion of the formation.

Accordingly, the present disclosure includes features and advantages which are believed to enable it to advance fracturing of a subterranean formation. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Also, the term "comprising" as used herein and in the appended claims is used in an open-ended fashion, and thus should be interpreted to mean "including, but not limited to . . . " The term "copolymer" as used herein shall comprise a polymer derived from two or more monomers and shall include terpolymers. Further, reference herein and in the appended claims to components does not necessarily limit the present disclosure or appended claims to only one such component or aspect, but should be interpreted generally to mean one or more, as may be suitable.

As an embodiment of the present disclosure, a well treatment fluid composition is provided wherein the crosslinking agent is zirconium acetylacetonate. The crosslinking agent is biodegradable in fresh water and salt water. The crosslinking agent is dissolved in an environmentally friendly solvent and may be used in low pH as well as high pH fluids using various hydratable polymers capable of gelling in its presence.

As such, the fluids disclosed herein provide a green alternative to treatment fluids containing conventional crosslinking agents. The viscosity of fluids having biodegradable zirconium acetylacetonate as crosslinking agent is substantially the same as the viscosity of fluids containing conventional non-biodegradable crosslinking agents.

The fluids disclosed herein are particularly effective for use to stimulate a well, including a gas well, oil well, water well, etc. In an embodiment, the well treatment fluids disclosed herein are used during a hydraulic fracturing operation or during an acidizing operation. In the latter, the fluids are capable of being diverted from high permeability or damaged portion of the formation to low permeability or undamaged portions of the formation.

The fluids disclosed herein may further be foamed fluids especially where it is desired to be used for under-pressured wells or in water sensitive zones.

In an embodiment, the zirconium acetylacetonate is dissolved in benzyl alcohol. In another embodiment, the solvent may be a blend of benzyl alcohol and 2,2-dimethyl-1,3-dioxolan-4(yl)-methanol. Where the blend is used, the amount of 2,2-dimethyl-1,3-dioxolan-4(yl)-methanol in the blend may be from 10 to 90 volume percent, more typically from about 40 to about 60 volume percent.

Typically, the amount of zirconium acetylacetonate crosslinker dissolved in the benzyl alcohol solvent (or solvent blend) is from 6 to 20 percent by weight, more typically from about 8 to about 12 percent by weight. The amount of crosslinking agent (dissolved in the benzyl alcohol or benzyl alcohol mixture) is generally from about 1.5 to about 150 pounds per 1,000 gallons of aqueous fracturing fluid.

The amount of crosslinking agent present in the aqueous fluid is that amount required to effectuate gelation or viscosification of the fluid at or near the downhole temperature of the targeted area. Typically, the amount of hydratable polymer employed is between from about 15 to about 50, preferably from about 20 to about 30, pounds per 1,000 gallons of water in the fluid.

The hydratable polymer for use in the fluid disclosed herein may be a synthetic or natural polymer and may contain one or more functional groups, such as a hydroxyl, carboxyl, sulfate, sulfonate, amino or amido group. Preferred synthetic and natural polymers include polysaccharides and derivatives thereof, polyvinyl alcohols, polyacrylates (including the (meth)acrylates), polypyrrolidones, polyacrylamides (including (meth)acrylamides) as well as 2-acrylamido-2-methylpropane sulfonate and mixtures thereof.

Suitable polysaccharides and derivatives include those which contain one or more monosaccharide units of galactose, fructose, mannose, glucoside, glucose, xylose, arabinose, glucuronic acid and pyranosyl sulfate. These include non-derivatized and derivatized guar gums, locust bean gum, karaya gum, tara, xanthan, succinoglycan, scleroglucan and carrageenan. These polysaccharides include guar gums and derivatives, starches and galactomannan gums.

In a preferred embodiment, the hydratable polymer is an underivatized guar or a derivatized guar, such as a hydroxyalkylated guar (like hydroxypropyl guar), a carboxyalkyl guar (like carboxymethyl guar) or a carboxyalkylhydroxyalkyl guar like carboxymethylhydroxypropyl). Preferred are carboxymethyl guar, hydroxypropyl guar, hydroxyethyl guar, hydroxybutyl guar and carboxymethylhydroxypropyl guar. CMHPG is often more preferred due to its ease of hydration, availability and tolerance to hard water.

In an embodiment, the hydratable polymer is a hydroxyalkylated guar having a molecular weight of about 1 to about 3 million. The degree of substitution (DS) of the carboxylated guar may be between from about 0.08 to about 0.18 and the hydroxypropyl content of the hydroxyalkylated guar may be between from about 0.2 to about 0.6.

Further, the polysaccharide may be a cellulosic derivative such as a hydroxyalkyl cellulose or alkylhydroxyalkyl cellulose, carboxyalkyl cellulose derivatives such as hydroxyethyl cellulose, hydroxypropyl cellulose, hydroxybutyl cellulose, hydroxyethylmethyl cellulose, hydroxypropylmethyl cellulose, hydroxybutylmethyl cellulose, methylhydroxyethyl cellulose, methylhydroxypropyl cellulose, ethylhydroxyethyl cellulose, carboxyethylcellulose, carboxymethylcellulose and carboxymethylhydroxyethyl cellulose.

Suitable synthetic polymers are those copolymers derived from at least one monomer of an acrylamide unit and a quaternary ammonium salt group, and optionally an acrylate and/or nitrogen heterocyclic monomer. The molar ratio of acrylamide unit:quaternary ammonium salt in the copolymer is generally between from about 1:5 to about 5:1.

Examples of the quaternary ammonium salt used include those obtained by cationizing a tertiary-amino-containing monomer such as N,N-dimethylaminoethyl (meth)acrylate, N,N-diethylaminoethyl (meth)acrylate, N,N-dimethylaminopropyl (meth)acrylate, N,N-diethylaminopropyl (meth)acrylate, N,N-dimethylaminoethyl (meth)acrylamide, N,N-diethylaminoethyl (meth)acrylamide, N,N-dimethylaminopropyl (meth)acrylamide, N,N-diethylaminopropyl (meth)acrylamide, p-dimethylaminomethylstyrene, p-dimethylaminoethylstyrene, p-diethylaminomethylstyrene or p-diethylaminoethylstyrene with a cationizing agent, for example, a halogenated alkyl such as methyl chloride, methyl bromide or methyl iodide, a dialkylsulfuric acid such as dimethylsulfuric acid, an epichlorohydrin-added tertiary amine mineral acid salt such as N-(3-chloro-2-hydroxypropyl)-N,N,N-trimethylammonium chloride, an inorganic salt such as hydrochloric acid, hydrobromic acid, sulfuric acid or phosphoric acid, or a carboxylic acid such as formic acid, acetic acid or propionic acid.

Further included are dialkyldiallylammonium salts, polyvinyl benzyl trialkyl ammonium salts, salts of polyepichlorohydrin quaternized with trialkyl amine, polymethacrylamidoalkyltrialkyl ammonium salts, polymethacryloyloxyalkyltrialkyl ammonium salts, and polymethacryloyloxyalkyl dialkyl hydroxyalkyl ammonium salt wherein the alkyl is preferably a $C_1$-$C_3$ alkyl group. These include polyvinyl benzyl trimethyl ammonium salts, salts of polyepichlorohydrin quaternized with trimethyl amine, polymethacrylamidopropyltrimethyl ammonium salts, polymethacryloyloxyethyltrimethyl ammonium salts, polyacrylamidopropyltrimonium chloride and polymethacryloyloxyethyl dimethyl hydroxyethyl ammonium salt.

Preferred quaternary ammonium salts include dimethyldiallylammonium salts, such as dimethyldiallylammonium chloride, and derivatives from acrylamide or acrylic acid such as acrylamidoethyltrimethylammonium chloride, acrylamide/dimethylaminoethyl acrylate methyl chloride quaternary ammonium salt, poly(acrylamide/dimethylaminoethyl methacrylate methyl chloride quaternary ammonium salt), poly(acrylamide/diallyldimethyl ammonium chloride), poly (dimethylaminoethyl acrylate methyl chloride quaternary ammonium salt), and poly(dimethylaminoethyl methacrylate methyl chloride quaternary ammonium salt).

In another especially preferred embodiment, the quaternary ammonium salt is of the formula:

(I)

wherein R is methyl or hydrogen; $R^4$ is a $C_1$ to $C_6$ alkyl group, optionally substituted with halogen, hydroxyl or an alkoxy (preferably ethoxy and methoxy) groups; most preferably $R^4$ is —$CH_2CH_2CH_2$—; X is halogen, preferably chlorine; and $R^1$, $R^2$ and $R^3$ are independently selected from the group consisting of alkyl and alkoxy groups, preferably methyl, ethyl, methoxy and ethoxy groups, most preferably $R^1$, $R^2$ and $R^3$ are each methyl.

Suitable for use as the "acrylamide" unit are acrylamide, (meth)acrylamide, diacetone acrylamide, and N-methylolacrylamide.

In an alternative embodiment, the copolymer for use in the disclosure is a terpolymer of an acrylic acid, an acrylamide and quaternary ammonium salt. Suitable as use for the acrylate are acrylic acid, (meth)acrylic acid as well as a salt of acrylic acid or (meth)acrylic acid. Such salts include alkali salts, like sodium salts. The molar ratio of the acrylic acid or salt thereof (when present) and the acrylamide is typically between from about 2:1 to about 1:3, preferably 1:1.

In still another alternative embodiment, the copolymer for use in the disclosure is a terpolymer of an acrylamide, quaternary ammonium salt and a nitrogen heterocyclic compound. Suitable nitrogen heterocyclic compounds include N-vinylpyrrolidone, N-vinylformamide, N-vinylacetamide, N-vinylcaprolactam, N-vinylimidazole and N-vinylpyridine. The terpolymer may further contain an acrylate. When present, the molar ratio of the nitrogen heterocyclic compound and the acrylamide is typically between from about 90:10 to about 10:90. In a preferred embodiment, the terpolymer comprises monomers in the molar ratios of 10 to 90 (acrylamide), 5 to 80 (quaternary ammonium salt) and 5 to 80 (nitrogen heterocyclic compound) (wherein the molar sum of acrylamide, quaternary ammonium salt and nitrogen heterocyclic compound is 100).

Other non-limiting examples of useful synthetic hydratable polymers include polyvinyl alcohol, poly 2-amino-2-methyl propane sulfonic acid, polyacrylamide, partially hydrolyzed polyacrylamide and copolymers containing acrylamide, terpolymers containing acrylamide, an acrylate, and a third species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups.

In a preferred mode, the synthetic polymer is an emulsion polymer, such as a copolymers of acrylamidomethylpropane sulfonic acid (AMPS), such as copolymers of AMPS and acrylamide, acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS) as well as salts thereof and combinations thereof.

Especially preferred copolymers are of the formula:

wherein m is 2 to 5 and n is 4 to 8. In one embodiment, such emulsion copolymers comprise a polymer dispersion in a hydrocarbon phase. In another embodiment, the emulsion polymer comprises microemulsion particles. In still another embodiment, the emulsion polymer comprises a liquid polymer dispersion. In an embodiment, the emulsion polymer has a general composition of about 20 to 50% acrylamidomethylpropane sulfonic acid (AMPS), about 2 to 5% acrylic acid, and about 45 to 78% acrylamide. More preferably, the polymer comprises about 35 to 50% AMPS.

A preferred copolymer for use in the disclosure are set forth in U.S. Pat. No. 8,022,015, herein incorporated by reference. Such copolymers include those derived from about acrylamide, acrylamidomethylpropanesulfonic acid and vinyl phosphonate including those containing from about 20 to about 90 wt. % acrylamide, about 9 to about 80 wt. % acrylamidomethylpropanesulfonic acid, and about 0.1 to about 20 wt. % vinyl phosphonate; alternatively, from about 30 to about 80 wt. % acrylamide, about 25 to about 60 wt. % acrylamidomethylpropanesulfonic acid, and about 0.2 to about 10 wt. % vinyl phosphonate; alternatively, from about 40 to about 70 wt. % acrylamide, about 30 to about 40 wt. % acrylamidomethylpropanesulfonic acid, and about 1 to about 3 wt. % vinyl phosphonate; or alternatively, about 50 wt. % acrylamide, about 30 wt. % acrylamidomethylpropanesulfonic acid, about 2 wt. % vinyl phosphonate, and a remainder of copolymers of acrylamide and acrylamidomethylpropanesulfonic acid.

The zirconium acetyl acetonate dissolved in the solvent disclosed herein may further be buffered to a desired pH range to render acidic as well as basic fluids. The pH of the fluid may be between from about 3.5 to about 11.5. As such, fluids containing the crosslinking agent may be buffered with acidic as well as basic buffering agents.

Generally, any pH buffer capable of maintaining an acidic or basic pH of well treatment fluid within the desired pH range may be used as a component of the fluid. Suitable pH buffers will be apparent to those of skill in the art. For instance, exemplary pH buffers for maintaining an acidic fluid may be weak organic acids and associated salts such as, for example, acetic acid, glacial acetic acid, sodium acetate, formic acid and combinations thereof. Suitable pH buffers for maintaining a basic fluid may be potassium hydroxide, potassium carbonate or a mixture thereof.

The pH buffer may be used in a concentration ranging from about 1 gallon per 1,000 gallons of fluid to about 3 gallons per 1,000 gallons of fluid.

In an embodiment, the pH buffer maintains a pH between from about 4.0 to about 6.5, typically between from about 4.5 to about 5.5. A buffered low pH fluid is often of great benefit in breaking down the polymeric structure of the hydratable polymer. As such, the low pH fluid is of great benefit during clean-up. In addition, the buffered low pH fluids are typically more preferred with low permeability sandstone formations since they cause less permeability damage to such formations. Further, they are often more preferred with underpressurized reservoirs and wells with severe clay issues since they more effectively prevent clay swelling and clay migration. Swelling and migration of clay can damage fracture conductivity. Further, they are more preferred in those instances where nitrogen or carbon dioxide is used with the fracturing fluid.

In another embodiment, the pH buffer may maintain the pH of the fluid to be between from about 8.0 to about 11.0, typically between from about 9.0 to about 10.5. Such fluids are particularly desirable when using enzyme breakers. For instance enzymatic catalysts are often effectively only in basic medium. This is especially the case where the hydratable polymer is a galactomannan gum.

In addition to the hydratable polymer, crosslinking agent and buffering or pH adjusting agents, various additives may also be useful in the fluids disclosed herein. Additives used in the oil and gas industry and known in the art, including but not limited to, corrosion inhibitors, non-emulsifiers, iron control agents, delay additives, silt suspenders, flowback additives, clay stabilizer, surfactants, gel breakers, complexing agents, biocides, surface tension reducing agent, scale inhibitors, gas hydrate inhibitors, acids or mixtures thereof. Other suitable additives useful in the present disclosure will be apparent to those of skill in the art and are to be considered within the scope of the present disclosure.

The well treatment fluid disclosed herein is particularly effective as a fracturing fluid wherein the fluid is pumped into a wellbore which penetrates a subterranean formation in order to initiate or enlarge a fracture. The fracturing fluid is injected at a rate sufficient to fracture the formation and to place proppant into the fracture.

As a fracturing fluid, the well treatment may further contain a proppant. Suitable proppants include those conventionally known in the art including quartz sand grains, glass beads, aluminum pellets, ceramics, plastic beads and ultra lightweight (ULW) particulates such as ground or crushed shells of nuts like walnut, coconut, pecan, almond, ivory nut, brazil nut, etc.; ground and crushed seed shells (including fruit pits) of seeds of fruits such as plum, olive, peach, cherry, apricot, etc.; ground and crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization, processing, etc. Further the proppant may include porous ceramics or organic polymeric particulates. The porous particulate material may be treated with a non-porous penetrating material, coating layer or glazing layer. Mixtures of such proppants may also be used.

When present, the amount of proppant in the well treatment fluid is typically between from about 0.5 to about 12.0, preferably between from about 1 to about 8.0, pounds of proppant per gallon of well treatment fluid.

In addition to their use as fracturing fluids, fluids disclosed herein having a pH of between from about 3.5 to about 6.5 may further be used as an acidizing fluid in the stimulation of a subterranean formation penetrated by a well where stages of the fluid may be diverted into productive zones of a formation having various permeabilities. The fluid is capable of being diverted from a high permeability zone to a low permeability zone of a subterranean formation. Since conductivity is permeability multiplied by injection geometry, this is synonymous to the statement that the well treatment fluid disclosed herein is capable of being diverted from a highly conductive primary fracture(s) to less conductive secondary fractures. Further, since conductivity is a function of the relative resistance to inflow, the reference to a conductive fracture as used herein is considered synonymous to a conductive reservoir area.

When used as a diverter, the fluid may be pumped directly to the high permeability zone of the well formation. The majority of the diverting fluid will enter into the high permeability or non-damaged zone and form a temporary "plug" or "viscous pill" from the increased viscosity of the fluid while the lower permeability zone has little invasion. This temporary "viscous pill" causes a pressure increase and diverts the fluid to a lower permeability portion of the formation.

Typically fluids encounter high shear while they are being pumped through the tubing which penetrates the wellbore. It is therefore desirable that the fluid have a crosslink delay mechanism in order to minimize friction, i.e., avoid having to pump a highly viscous fluid in light of the resultant high horsepower requirements. In addition, a delay in crosslinking through a high-shear wellbore environment minimizes shear degradation and loss of fluid viscosity. Unfortunately, it is very difficult to control the delay of low pH fluids, particularly upon the addition of carbon dioxide. The fluids defined herein thus offer an advantage over the fluids of the prior art since the crosslinking agent provides a delay mechanism for interacting with the hydratable polymer The crosslinking agent disclosed herein may be combined with the other components of the fluid in a batch process performed at the wellsite using mixing vessels or may be batched mixed away from the wellsite and transported to the wellsite. In a preferred embodiment, the fluid containing is prepared on the fly using continuous mixing methods at the wellsite.

All percentages set forth in the Examples are given in terms of weight units except as may otherwise be indicated.

EXAMPLES

Example 1

Aqueous fluids were prepared comprising 2.5 gallons per thousand (gpt) or 3.75 gpt of a 10% by weight solution of zirconium (IV) acetylacetonate in benzyl alcohol, 7.5 gpt of a slurry of 4 pounds per gallon (ppg) carboxymethyl guar (CMG) in mineral oil, 3 gpt of sodium thiosulfate gel stabilizer, 1 gpt of BF-9L, a high pH buffer commercially available from Baker Hughes Incorporated and 1 gpt of a clay stabilizer, commercially available as CLAYTREAT 3C™ from Baker Hughes Incorporated. In a comparison 1.5 gpt of XLW-14, a zirconate/triethanolamine crosslinker disclosed in U.S. Pat. No. 4,534,870 and available from Baker Hughes Incorporated, was used in place of the instant crosslinker, zirconium acetylacetonate in benzyl alcohol. The pH of each of the fluids was approximately 10.0.

The fluids were then placed into a special holding cup attached to a Fann50 viscometer model 50C. Nitrogen pressure (300 psi) was then applied into the cup which was then lowered into a heated oil bath. The Fann50 was then set to determine the viscosity of the test fluid at a shear rate of 100 $sec^{-1}$. The viscosity measurements of the fluids are illustrated in FIG. 1.

Figure 1:
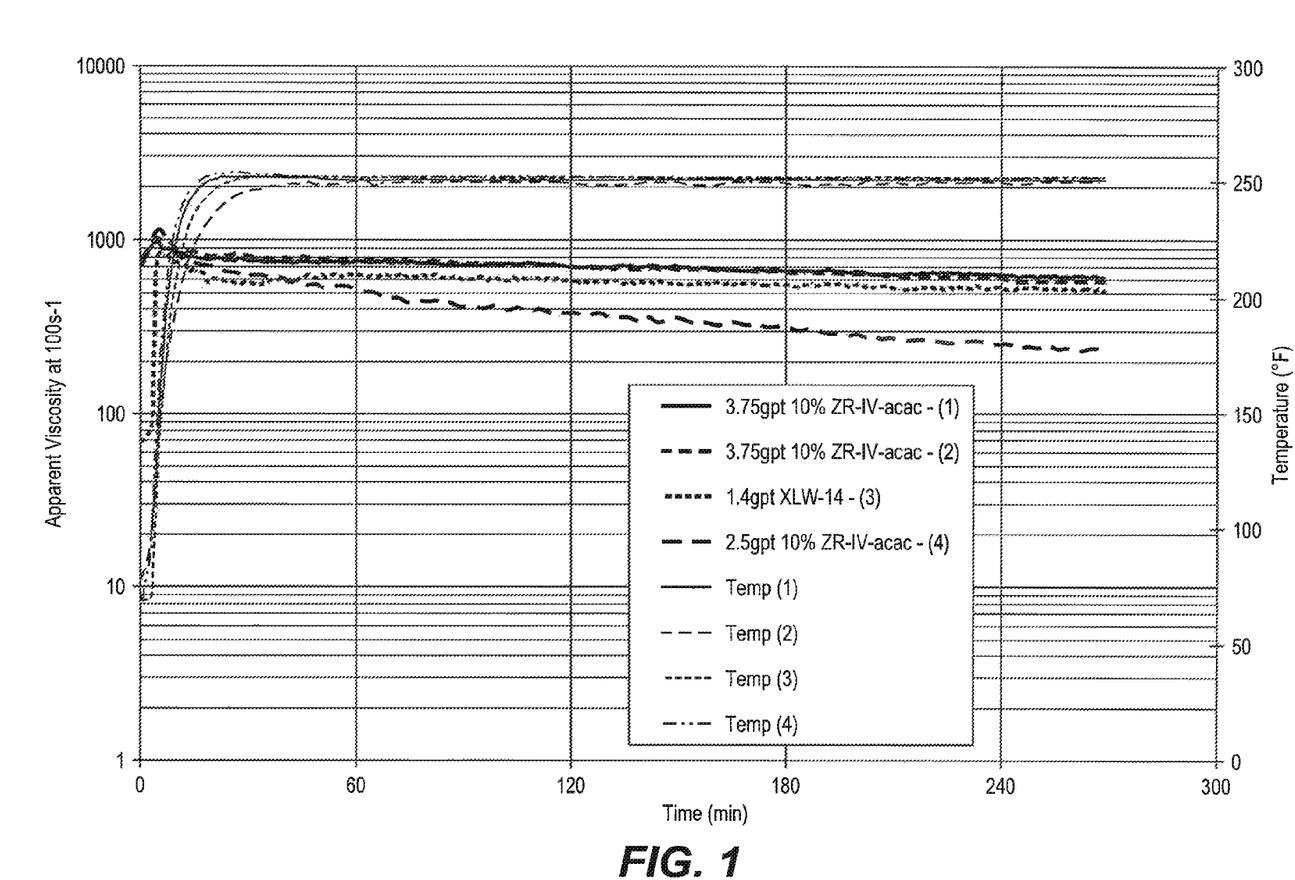
FIG. 1 is a graph of the apparent viscosity of fluids containing the biodegradable crosslinker of the disclosure and carboxymethyl guar wherein the fluid is buffered to a pH of about 10 and further contrasts a buffered fluid of the prior art containing a non-biodegradable crosslinker.

FIG. 1 illustrates that buffered fluids of a pH of about 10 and containing the biodegradable crosslinker defined in the disclosure provides comparable viscosity as fluids of like pH containing the non-biodegradable crosslinkers of the prior art.

Example 2

Three buffered fluids were prepared comprising a 10% by weight solution of zirconium (IV) acetylacetonate in benzyl alcohol and 7.5 gpt of a slurry of 4 pounds per gallon (ppg) carboxymethyl guar (CMG) in mineral oil. 0.5 gpt of BF-9L was added to two of the solutions and crosslinked with 1.5 and 2 gpt crosslinker solution which resulted in buffered pH of about 10.0 and 9.5, respectively. Using 2 gpt of BF-10L, a buffering agent of a blend of acetic acid and glacial acetic acid, commercially available from Baker Hughes Incorporated. The third fluid was crosslinked with 1.5 gpt of crosslinker resulting in a buffered pH of about 5.0. The zirconium (IV) acetylacetonate in the fluid buffered to a pH of 5.0 was dissolved in a 50:50 v/v blend of benzyl alcohol: 2,2-dimethyl-1,3-dioxolam-4-methanol.

The fluids were then placed into a special holding cup attached to a Fann50 viscometer model 50C. Nitrogen pressure (300 psi) was then applied into the cup which was then lowered into an oil bath heated to 200° F. The Fann50 was then set to determine the viscosity of the test fluid at a shear rate of 100 sec$^{-1}$. The viscosity measurements of the fluids are illustrated in FIG. 2.

Figure 2:
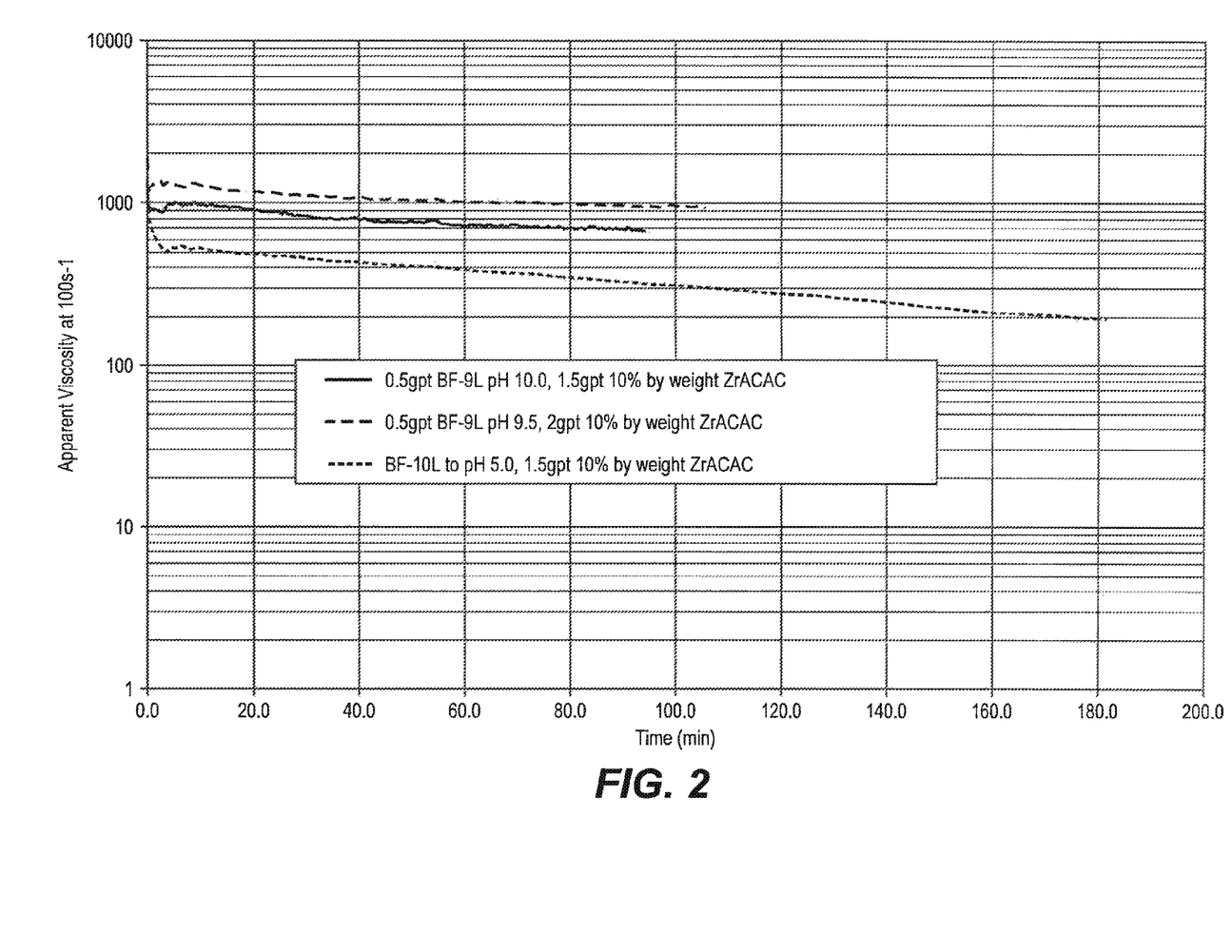
FIG. 2 is a graph of the apparent viscosity of fluids containing the biodegradable crosslinker defined in the disclosure and carboxymethyl guar wherein fluids are buffered to basic as well as acidic pH conditions.

FIG. 2 illustrates that the biodegradable crosslinker defined in the disclosure provides the requisite viscosity for fracturing fluids buffered to basic as well as acidic pH conditions.

Example 3

Three buffered fluids were prepared comprising a 10% by weight solution of zirconium (IV) acetylacetonate in benzyl alcohol and 7.5 gpt of a slurry of 4 pounds per gallon (ppg) carboxymethylhydroxypropyl guar (CMHPG) in mineral oil. 0.5 gpt of BF-9L was added to two of the solutions and crosslinked with 1.5 and 2 gpt crosslinker solution which resulted in buffered pH of about 10.0 and 9.5, respectively. Using 2 gpt of BF-10L, a buffering agent of a blend of acetic acid and glacial acetic acid, commercially available from Baker Hughes Incorporated, The third fluid was crosslinked with 2 gpt of the of crosslinker resulting in a buffered pH of about 5.5 using BF-10L, a buffering agent of a blend of acetic acid and glacial acetic acid, commercially available from Baker Hughes Incorporated. The fluids were then placed into a special holding cup attached to a Fann50 viscometer model 50C. Nitrogen pressure (300 psi) was then applied into the cup which was then lowered into an oil bath heated to 200° F. The Fann50 was then set to determine the viscosity of the test fluid at a shear rate of 100 sec$^{-1}$. The viscosity measurements of the fluids are illustrated in FIG. 3.

Figure 3:
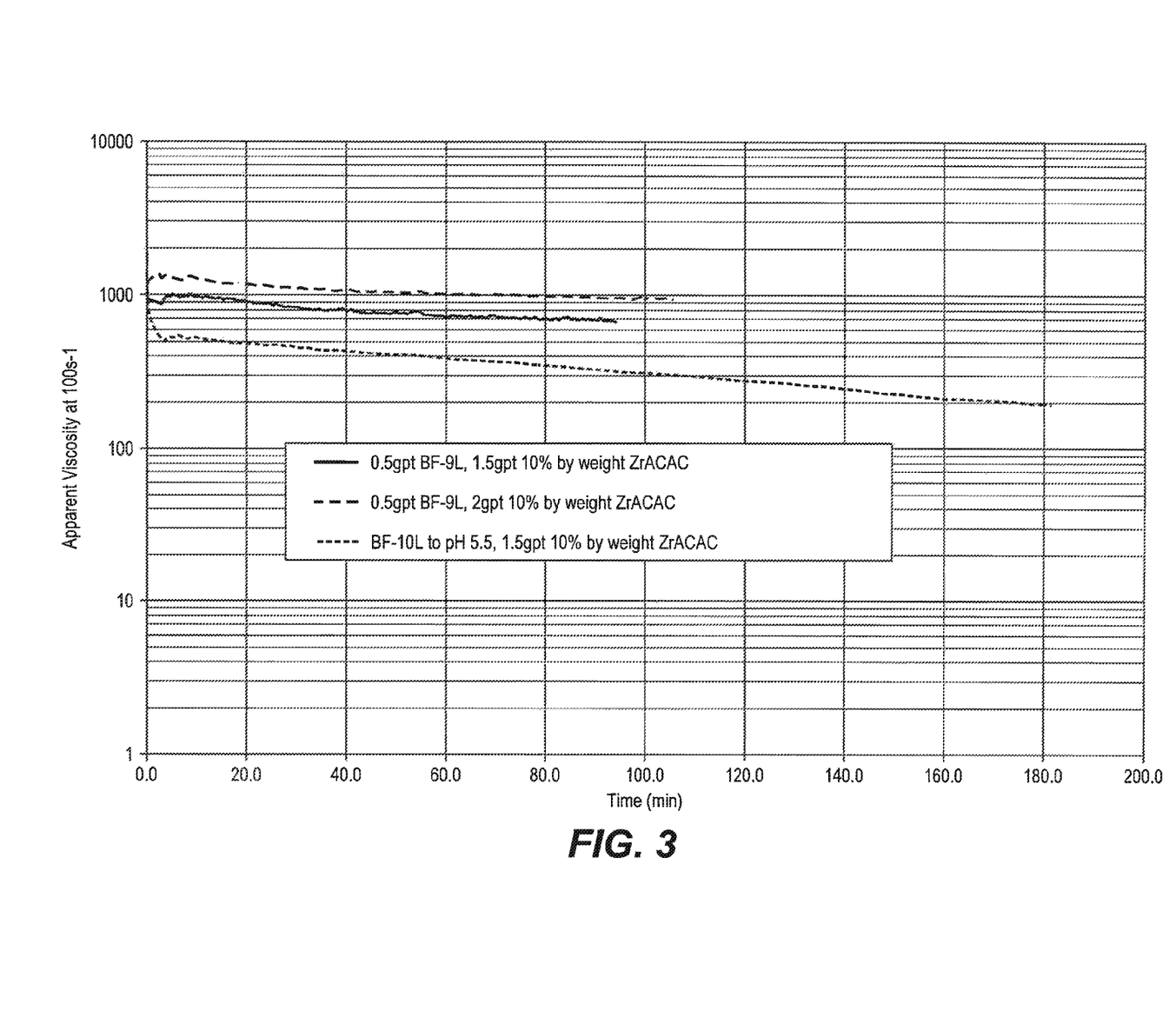
FIG. 3 is a graph of the apparent viscosity of fluids containing the biodegradable crosslinker defined in the disclosure and carboxymethylhydroxypropyl guar wherein the fluids are buffered to basic as well as acidic pH conditions.

FIG. 3 illustrates that the biodegradable crosslinker defined in the disclosure provides the requisite viscosity for fracturing fluids buffered to basic as well as acidic pH conditions.

Example 4

Aqueous fluids were prepared comprising 1.5 gpt of a 10% by weight solution of zirconium (IV) acetylacetonate dissolved in a 50:50 v/v blend of benzyl alcohol:2,2-dimethyl-1,3-dioxolam-4-methanol. The fluid also contained 17.5 gpt of an invert emulsion of a copolymer of acrylamido-methyl propane sulfonate/acrylic acid (AMPS/AA) and vinyl phosphonate, disclosed in U.S. Pat. No. 8,022,015, as well as 1 gpt of surfactant (commercially available as PSA-65L from Baker Hughes Incorporated) and buffered to a pH of 5.5 with BF-10L. One of the fluids also contained 4 gpt of sodium thiosulfate gel stabilizer.

Figure 4:
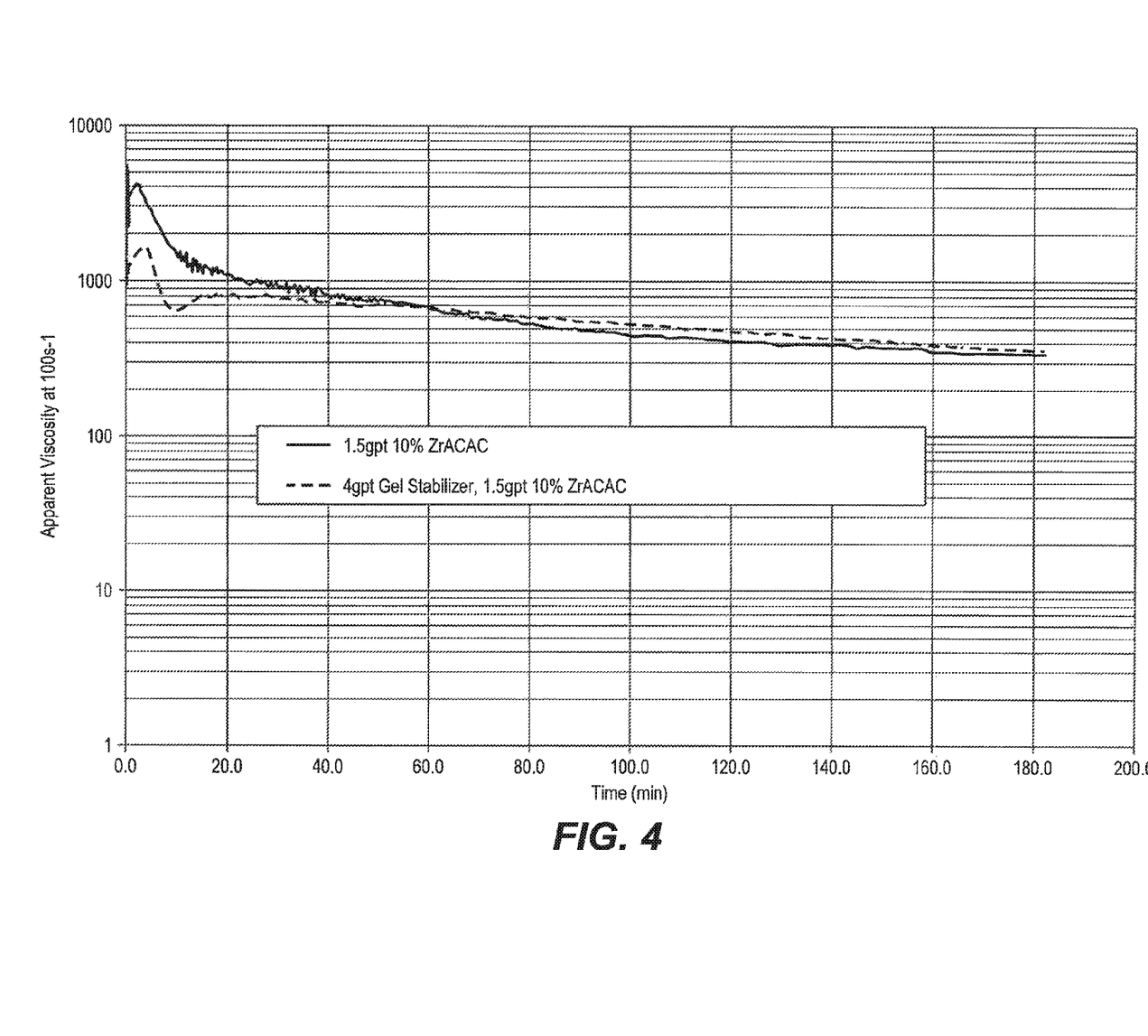
FIG. 4 is a graph of the apparent viscosity of fluids containing the biodegradable crosslinked defined in the disclosure and a hydratable polymer of a copolymer of acrylamido-methyl propane sulfonate/acrylic acid (AMPS/AA) and vinyl phosphonate wherein the fluids are buffered to a pH of 5.5.

The fluids were then placed into a special holding cup attached to a Fann50 viscometer model 50C. Nitrogen pressure (300 psi) was then applied into the cup which was then lowered into an oil bath heated to 350° F. The Fann50 was then set to determine the viscosity of the test fluid at a shear rate of 100 sec$^{-1}$. The viscosity measurements of the fluids are illustrated in FIG. 4 which illustrates the fluid to be an acceptable alternative to conventional non-biodegradable crosslinkers in fracturing fluids.

While exemplary embodiments of the disclosure have been shown and described, many variations, modifications and/or changes in the fluids or the methods of the present disclosure are possible and within the scope of the appended claims and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:
1. A method of stimulating a subterranean formation penetrated by a well comprising:
   A. pumping into the well a well treatment fluid, the well treatment fluid comprising:
      (i) a crosslinking solution comprising zirconium acetylacetonate crosslinker dissolved in a solvent of benzyl alcohol; and
      (ii) a hydratable polymer capable of gelling in the presence of a zirconium acetylacetonate crosslinking agent and selected from the group consisting of guar gum, guar gum derivatives, locust bean gum, karaya gum, a cellulosic derivative, polyvinyl alcohol, poly 2-amino-2-methyl propane sulfonic acid, copolymers of acrylamidomethylpropane sulfonic acid (AMPS) and salts thereof and combinations thereof; and
   (B) producing a crosslinked gelled fluid from (i) and (ii) after pumping of the well treatment fluid into the well and when the temperature in the well is at least 100° F.

2. The method of claim 1, wherein the pH of the fluid is between from about 3.5 to about 11.5.

3. The method of claim 2, wherein the fluid is a fracturing fluid and further wherein the fracturing fluid is pumped into the well at a pressure sufficient to initiate or enlarge a fracture in the subterranean formation.

4. The method of claim 2, wherein the pH of the fluid is between from about 8.0 to about 11.0.

5. The method of claim 2, wherein the pH of the fluid is between from about 3.5 to about 6.5.

6. The method of claim 5, wherein the fluid is a diverting fluid and wherein flow of the fluid is diverted from a high permeability or damaged portion of the formation to a low permeability or undamaged portion of the formation.

7. The method of claim 1, wherein the hydratable polymer is selected from the group consisting of underivatized guar, hydroxypropyl guar, carboxymethyl guar, carboxymethylhydroxypropyl guar, carboxymethyl, cellulose and carboxymethylhydroxyethyl cellulose and combinations thereof.

8. The method of claim 1, wherein the amount of zirconium acetylacetonate crosslinker dissolved in the benzyl alcohol solvent is from 6 to 20 percent by weight.

9. The method of claim 1, wherein the solvent further comprises 2,2-dimethyl-1,3-dioxolan-4(yl)-methanol.

10. The method of claim 9, wherein the volume ratio of benzyl alcohol:2,2-dimethyl-1,3-dioxolan-4(yl)-methanol is between from about 10:90 to 90:10.

11. The method of claim 1, comprising:
(C) pumping the well treatment fluid into the well during an acidizing operation as a first acid stage;
(D) pumping into the well one or more subsequent stages of the well treatment fluid after pumping the first acid stage into the formation; and
(E) diverting the flow of the one or more subsequent stages of the well treatment fluid from high permeability or damaged portions of the formation to low permeability or undamaged portions of the formation.

12. The method of claim 11, wherein the solvent further comprises 2,2-dimethyl-1,3-dioxolan-4(yl)-methanol.

13. The method of claim 1, wherein the fluid is prepared on the fly.

14. The method of claim 1, wherein the fluid is a foamed fluid and further wherein the well is an under-pressured well and wherein the foamed fluid is pumped into the under-pressured well or into a water sensitive zone within the well.

15. A method of stimulating a subterranean formation penetrated by well comprising:
(a) pumping into the well a well treatment fluid comprising (i) zirconium acetylacetonate dissolved in a mixture of benzyl alcohol and 2,2-dimethyl-1,3-dioxolan-4(yl)-methanol; and (ii) a hydratable polymer capable of gelling in the presence of a zirconium acetylacetonate crosslinking agent and selected from the group consisting of guar gum, guar gum derivatives, locust bean gum, karaya gum, a cellulosic derivative, polyvinyl alcohol, poly 2-amino-2-methyl propane sulfonic acid, polyacrylamide, partially hydrolyzed polyacrylamide and copolymers containing acrylamide, polymers and copolymers of acrylamidomethylpropane sulfonic acid (AMPS) and salts thereof, phosphinated maleic copolymer (PHOS/MA), salts of polymaleic acid/acrylic acid/acrylamido-methyl propane sulfonate terpolymers (PMA/AMPS), copolymers derived from acrylamide, acrylamidomethylpropanesulfonic acid, and vinyl phosphonate; and combinations thereof; and combinations thereof; and
(b) delaying crosslinking of the well treatment fluid until temperature within the well is at least 100° F.

16. The method of claim 15, wherein the pH of the well treatment fluid is between from about 3.5 to about 11.5.

17. The method of claim 15, wherein the well treatment fluid further comprises a buffer and wherein the pH of the well treatment fluid is either between from about 4.0 to about 6.5 or from about 8.0 to about 11.0.

18. The method of claim 15, wherein the solvent is benzyl alcohol and further wherein the amount of zirconium acetylacetonate dissolved in the benzyl alcohol solvent is from about 6 to about 20 percent by weight.

19. The method of claim 18, wherein the hydratable polymer is selected from the group consisting of underivatized guar, hydroxypropyl guar, carboxymethyl guar, carboxymethylhydroxypropyl guar, carboxymethyl cellulose, carboxymethylhydroxyethyl cellulose, hydroxyethyl cellulose and copolymers derived from acrylamide, acrylamidomethylpropanesulfonic acid, vinyl phosphonate and combinations thereof.

20. The method of claim 15, wherein the pH of the well treatment fluid is between from about 3.5 to about 11.0.

21. A method of stimulating a subterranean formation penetrated by well comprising:
(a) pumping into the well a well treatment fluid comprising (i) zirconium acetylacetonate dissolved in a solvent consisting essentially of either benzyl alcohol or a mixture of benzyl alcohol and 2,2-dimethyl-1,3-dioxolan-4(yl)-methanol; and (ii) a hydratable polymer capable of gelling in the presence of a zirconium acetylacetonate crosslinking agent and selected from the group consisting of guar gum, guar gum derivatives, locust bean gum, karaya gum, a cellulosic derivative, polyvinyl alcohol, poly 2-amino-2-methyl propane sulfonic acid, polyacrylamide, partially hydrolyzed polyacrylamide and copolymers containing acrylamide, polymers and copolymers of acrylamidomethylpropane sulfonic acid (AMPS) and salts thereof, phosphinated maleic copolymer (PHOS/MA), salts of polymaleic acid/acrylic acid/acrylamido-methyl propane sulfonate terpolymers (PMA/AMPS), copolymers derived from acrylamide, acrylamidomethylpropanesulfonic acid, and vinyl phosphonate; and combinations thereof; and combinations thereof; and
(b) delaying crosslinking of the well treatment fluid until temperature within the well is at least 100° F.

22. The method of claim 21, wherein the hydratable polymer is selected from the group consisting of underivatized guar, hydroxypropyl guar, carboxymethyl guar, carboxymethylhydroxypropyl guar, carboxymethyl and carboxymethylhydroxyethyl cellulose.

* * * * *